(12) United States Patent
Irifune et al.

(10) Patent No.: US 8,211,547 B2
(45) Date of Patent: Jul. 3, 2012

(54) LOW-VISCOSITY ULTRAVIOLET-CURABLE SILICONE COMPOSITION FOR RELEASE PAPER

(75) Inventors: Shinji Irifune, Annaka (JP); Akinari Itagaki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 569 days.

(21) Appl. No.: 12/413,960

(22) Filed: Mar. 30, 2009

(65) Prior Publication Data

US 2009/0246540 A1    Oct. 1, 2009

(30) Foreign Application Priority Data

Mar. 31, 2008    (JP) .................. 2008-090849

(51) Int. Cl.
*B32B 15/04* (2006.01)
(52) U.S. Cl. ............. 428/452; 528/21; 528/23; 528/27; 528/33; 528/34
(58) Field of Classification Search .................. 428/452; 528/21, 23, 27, 33, 34
See application file for complete search history.

(56) References Cited

U.S. PATENT DOCUMENTS 5,721,291 A * 2/1998 Gaulle et al. ............ 522/38
2003/0232900 A1 12/2003 Irifune

FOREIGN PATENT DOCUMENTS

| | | |
|---|---|---|
| EP | 0 391 162 A2 | 10/1990 |
| EP | 0 473 995 A2 | 3/1992 |
| EP | 0 599 615 A2 | 6/1994 |
| EP | 0 738 769 A1 | 10/1996 |
| GB | 2 123 842 A | 2/1984 |
| JP | 4-159322 | 6/1992 |
| JP | 6-240001 | 8/1994 |
| JP | 7-2976 | 1/1995 |
| JP | 7-24288 | 1/1995 |
| JP | 2001-40066 | 2/2001 |
| JP | 3384268 | 12/2002 |

OTHER PUBLICATIONS

Office Action issued Sep. 6, 2010, in Japan Patent Application No. 2008-090849 (with English translation).

* cited by examiner

*Primary Examiner* — Edward Cain
(74) *Attorney, Agent, or Firm* — Oblon, Spivak, McClelland, Maier & Neustadt, L.L.P.

(57) ABSTRACT

An ultraviolet-curable silicone composition for a release paper including (A) 100 parts by mass of a specific organopolysiloxane having a polymerization degree of 8 to 20 and containing one epoxy group, and (C) an effective quantity of an onium salt photoinitiator. In a preferred embodiment, the composition further includes (B) 10 to 1,000 parts by mass of at least one specific organopolysiloxane containing a plurality of epoxy groups. In another preferred embodiment, the composition has a viscosity of not more than 100 mPa·s. The composition has a peel strength that exhibits a positive dependency on the peel speed when peeled from a hot-melt pressure-sensitive adhesive, and can therefore be used to produce a release paper capable of reducing peeling noise. Further, because the composition has a low viscosity, it exhibits excellent wetting of substrates having significant unevenness, even in a solventless form.

17 Claims, No Drawings

LOW-VISCOSITY ULTRAVIOLET-CURABLE SILICONE COMPOSITION FOR RELEASE PAPER

BACKGROUND OF THE INVENTION

1. Field of the Invention

The present invention relates to a low-viscosity ultraviolet-curable silicone composition for a release paper.

2. Description of the Prior Art

A variety of ultraviolet-curable silicone compositions have been proposed. In recent years, a multitude of curing methods have been proposed in which an epoxy group-containing silicone is cured using an onium salt photoinitiator as a catalyst (see Patent Documents 1 to 3). This type of curing method differs from curing methods that utilize a radical reaction, and because the curing reaction proceeds favorably in air with no curing inhibition caused by oxygen, compositions that use this curing method are now being used for treatment agents for the back surface of pressure-sensitive adhesive tapes, and as coating materials for release papers used with pressure-sensitive adhesive labels. Furthermore, from the viewpoints of health and safety, there is strong demand for ultraviolet-curable silicone compositions that do not require dilution with a solvent, but can be applied directly to a substrate in a solventless state, and subsequently cured.

Generally, in those cases where a solventless silicone is applied, provided the substrate surface is flat, even a high-viscosity solventless silicone can be used. However, when a solventless silicone is coated onto a substrate surface that lacks planarity and has significant unevenness, if the viscosity of the silicone is too high, then the quantity of silicone applied must be increased to cover the unevenness on the substrate surface. Accordingly, in those cases where a solventless silicone is coated onto a substrate having significant unevenness, the viscosity of the silicone must be lowered.

Furthermore, in recent years, for reasons of health and safety, hot-melt pressure-sensitive adhesives that use no solvent have become widely used as the pressure-sensitive adhesives for pressure-sensitive adhesive tapes and pressure-sensitive adhesive labels. Hot-melt pressure-sensitive adhesives generally tend to be harder than pressure-sensitive adhesives prepared using solvent dilution, and therefore when a release paper that has been bonded to a hot-melt pressure-sensitive adhesive in a releasable manner is peeled away from the adhesive, a peeling noise tends to occur. This peeling noise tends to be smaller when the peel strength required to peel the release paper from the pressure-sensitive adhesive has a positive dependency on the peel speed (in other words, when the peel strength increases as the peel speed is increased). Accordingly, there is a demand for silicone compositions for release papers in which the peel strength exhibits a positive dependency relative to the peel speed.

[Patent Document 1] GB 2123842 A
[Patent Document 2] EP 0391162 A2
[Patent Document 3] US 2003/0232900 A1

SUMMARY OF THE INVENTION

The present invention has been developed in light of the above circumstances, and has an object of providing a solventless ultraviolet-curable silicone composition, which can be used for a release paper in which the peel strength exhibits a positive dependency on the peel speed when peeled from a hot-melt pressure-sensitive adhesive, meaning peeling noise can be reduced, and which has low viscosity and therefore exhibits excellent wetting of substrates having significant unevenness.

As a result of intensive investigation aimed at achieving the above object, the inventors of the present invention discovered that by using a silicone composition comprising an onium salt photoinitiator and a specific organopolysiloxane having a polymerization degree of 8 to 20 and containing one epoxy group, the above object could be achieved, and they were therefore able to complete the present invention.

In other words, a first aspect of the present invention provides an ultraviolet-curable silicone composition for a release paper, the composition comprising:

(A) 100 parts by mass of an organopolysiloxane containing one epoxy group, represented by a general formula (1) shown below:

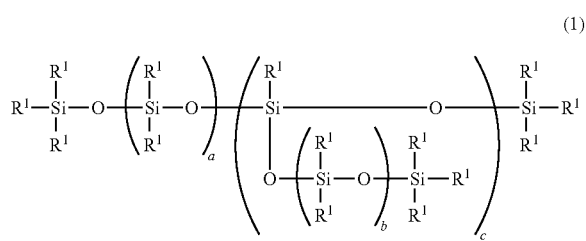

wherein each $R^1$ represents, independently, a substituted monovalent hydrocarbon group of 1 to 10 carbon atoms containing an epoxy group, or an unsubstituted or substituted monovalent hydrocarbon group of 1 to 10 carbon atoms that does not contain an epoxy group, provided that only one of all the $R^1$ groups is a substituted monovalent hydrocarbon group of 1 to 10 carbon atoms containing an epoxy group, a and b each represents an integer of 0 or greater, and c represents an integer of 0 to 5, provided that $a+(b+2)\times c+2$ is an integer of 8 to 20, and (C) an effective quantity of an onium salt photoinitiator.

A second aspect of the present invention provides a cured coating obtained by curing the above composition.

A third aspect of the present invention provides a release paper comprising a substrate, and a cured coating formed on top of the substrate, wherein the cured coating is obtained by curing the above composition.

The composition of the present invention has a low viscosity even though it is solventless, and therefore exhibits excellent wetting properties, even of substrates having significant unevenness. Further, the composition comprises an onium salt photoinitiator as a catalyst, and is readily cured by irradiation with ultraviolet light. The thus obtained cured coating adheres favorably to substrates formed of plastic or the like, and can be readily peeled from pressure-sensitive adhesive materials. In particular, a release paper comprising the cured coating has a peel strength that exhibits a positive dependency on the peel speed when peeled from a hot-melt pressure-sensitive adhesive, meaning peeling noise can be reduced. Accordingly, the composition of the present invention is useful as a release agent for release papers and release films, a coating agent for release papers for use with pressure-sensitive adhesive labels, a treatment agent for the rear surface of pressure-sensitive adhesive tapes, and a protective coating agent for metals and plastics.

DETAILED DESCRIPTION OF THE PREFERRED EMBODIMENTS

A more detailed description of the present invention is presented below. In the present invention, viscosity values refer to values measured at 25° C. using a rotational viscometer.

[Component (A)]

The component (A) is an organopolysiloxane containing one epoxy group, represented by a general formula (1) shown below:

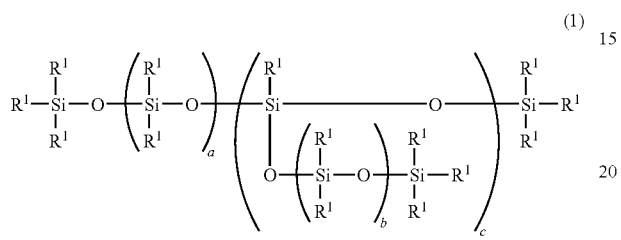

wherein each $R^1$ represents, independently, a substituted monovalent hydrocarbon group of 1 to 10 carbon atoms containing an epoxy group, or an unsubstituted or substituted monovalent hydrocarbon group of 1 to 10 carbon atoms that does not contain an epoxy group, provided that only one of all the $R^1$ groups is a substituted monovalent hydrocarbon group of 1 to 10 carbon atoms containing an epoxy group, a and b each represents an integer of 0 or greater, and c represents an integer of 0 to 5, provided that a+(b+2)×c+2 is an integer of 8 to 20. The component (A) may use either a single compound or a combination of two or more different compounds.

$R^1$ contains from 1 to 10 carbon atoms, preferably from 1 to 8 carbon atoms, and even more preferably from 1 to 6 carbon atoms.

In those cases where $R^1$ represents an unsubstituted or substituted monovalent hydrocarbon group of 1 to 10 carbon atoms that does not contain an epoxy group, examples of $R^1$ include alkyl groups of 1 to 10 carbon atoms, and preferably 1 to 6 carbon atoms, such as a methyl group, ethyl group, propyl group, butyl group, isopropyl group, isobutyl group, tert-butyl group, hexyl group, octyl group or 2-ethylhexyl group; cycloalkyl groups of 3 to 10 carbon atoms, and preferably 4 to 6 carbon atoms, such as a cyclohexyl group; aryl groups of 6 to 10 carbon atoms, and preferably 6 to 8 carbon atoms, such as a phenyl group or tolyl group; or groups in which some or all of the hydrogen atoms bonded to carbon atoms in the above monovalent hydrocarbon groups have been substituted with a hydroxyl group, a cyano group or a halogen atom (such as a fluorine atom, chlorine atom, bromine atom or iodine atom) or the like, such as a hydroxypropyl group, cyanoethyl group, 1-chloropropyl group or 3,3,3-trifluoropropyl group.

In those cases where $R^1$ represents a substituted monovalent hydrocarbon group of 1 to 10 carbon atoms containing an epoxy group, examples of $R^1$ include groups of 1 to 10 carbon atoms in which some or all of the hydrogen atoms within an aforementioned unsubstituted or substituted monovalent hydrocarbon group of 1 to 10 carbon atoms that does not contain an epoxy group have been substituted with an epoxy group-containing group, and groups in which two hydrogen atoms bonded to two adjacent carbon atoms within an aforementioned unsubstituted or substituted monovalent hydrocarbon group of 1 to 10 carbon atoms that does not contain an epoxy group have been substituted with a single oxygen atom, thereby forming a linkage represented by —O— between the two carbon atoms.

Examples of epoxy group-containing groups include an epoxy group, a glycidyl group, a glycidoxy group, epoxycyclohexyl groups such as a 3,4-epoxycyclohexyl group; and epoxymethylcyclohexyl groups such as a 3,4-epoxy-4-methyl-cyclohexyl group.

Specific examples of the substituted monovalent hydrocarbon group of 1 to 10 carbon atoms containing an epoxy group include the structures shown below.

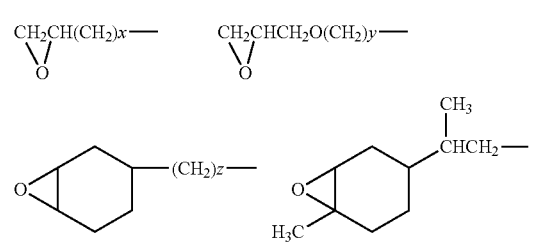

wherein x represents an integer of 0 to 8, y represents an integer of 0 to 7, and z represents an integer of 0 to 4.

Of these, β-epoxycyclohexylethyl groups such as a β-(3,4-epoxycyclohexyl)ethyl group are the most desirable.

In terms of the releasability of the cured product of the composition of the present invention, other than the substituted monovalent hydrocarbon group of 1 to 10 carbon atoms containing an epoxy group, all of the $R^1$ groups are preferably alkyl groups or aryl groups, and are most preferably methyl groups.

The average polymerization degree of the component (A), which is represented by a+(b+2)×c+2, is an integer of 8 to 20, and is preferably an integer of 10 to 15. c is an integer of 0 to 5, and is preferably an integer of 0 to 3. Because the average polymerization degree of the component (A) is a low value of not more than 20, the component (A) is necessarily a low-viscosity liquid component with a viscosity at 25° C. of not more than 100 mPa·s.

[Component (B)]

Component (B) is an optional component, and is at least one epoxy group-containing organopolysiloxane selected from the group consisting of organopolysiloxanes containing a plurality of epoxy groups represented by general formulas (2) to (9) shown below.

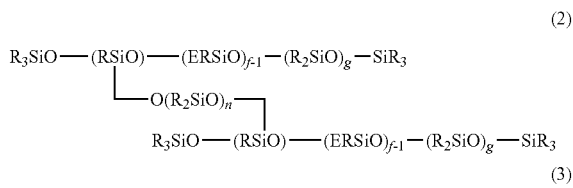

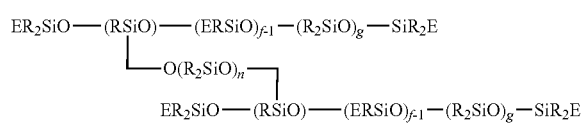

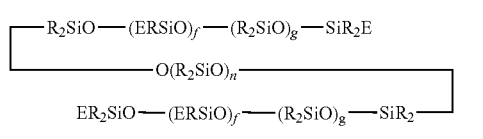

(4)

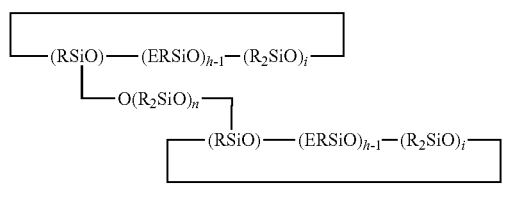

(5)

(6)

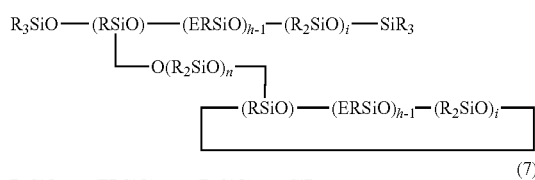

(7)

$$R_3SiO\text{—}(ERSiO)_f\text{—}(R_2SiO)_g\text{—}SiR_3 \quad (8)$$

$$ER_2SiO\text{—}(ERSiO)_f\text{—}(R_2SiO)_g\text{—}SiR_2E \quad (9)$$

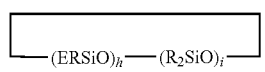

wherein R represents an unsubstituted or substituted monovalent hydrocarbon group of 1 to 10 carbon atoms that does not contain an epoxy group, E represents an epoxy group-containing monovalent organic group, f, h and n each represents an integer of 2 or greater, and g and i each represents an integer of 0 or greater.

Each of the epoxy group-containing organopolysiloxanes represented by the above general formulas (2) to (9) may be used as either a single compound, or a combination of two or more different compounds.

R contains from 1 to 10 carbon atoms, preferably from 1 to 8 carbon atoms, and even more preferably from 1 to 6 carbon atoms.

Specific examples of R include the same monovalent hydrocarbon groups as those listed above for $R^1$ in the case where $R^1$ represents an unsubstituted or substituted monovalent hydrocarbon group of 1 to 10 carbon atoms that does not contain an epoxy group.

In terms of the releasability of the cured product of the composition of the present invention, R is preferably one of the alkyl groups or aryl groups listed above for $R^1$, compounds in which 80 to 100 mol % of the R groups are methyl groups are more preferred, and compounds in which all of the R groups are methyl groups are the most desirable.

Examples of the epoxy group-containing monovalent organic group represented by E include the same groups as those listed above for $R^1$ in the case where $R^1$ represents a substituted monovalent hydrocarbon group of 1 to 10 carbon atoms containing an epoxy group.

Specific examples of E include the groups shown below.

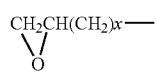 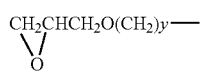

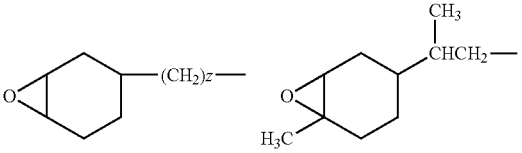

wherein x, y and z are as defined above.

Of these groups, β-epoxycyclohexylethyl groups such as a β-(3,4-epoxycyclohexyl)ethyl group are the most desirable.

f, h and n each represents an integer of 2 or greater, and g and i each represents an integer of 0 or greater. These values of f through i and n are preferably integers that yield a viscosity at 25° C. for the component (B) that is within a range from 50 to 2,000 mPa·s, and are more preferably integers that yield a viscosity within a range from 100 to 1,000 mPa·s.

The proportion of epoxy group-containing siloxane units among the combined total of all the siloxane units of the component (B) is preferably within a range from 2 to 40 mol %, and is more preferably from 5 to 25 mol %. Provided the proportion is within this range, the curability of the composition of the present invention is more favorable, and the residual adhesiveness rate, the ease of releasability, and the slipperiness of the cured coating of the composition are superior.

The epoxy group-containing organopolysiloxane of the component (B) can be produced, for example, using the synthesis method disclosed in JP 3384268 B.

In those cases where the component (B) is added to the composition of the present invention, the quantity added is typically within a range from 10 to 1,000 parts by mass, preferably from 20 to 600 parts by mass, and more preferably from 40 to 400 parts by mass, per 100 parts by mass of the component (A). Provided the quantity added is within this range, the viscosity of the composition of the present invention can be prevented from becoming too high, and the releasability of the cured coating of the composition can be further improved.

[Component (C)]

The component (C) is an onium salt photoinitiator, and is used for curing the silicone composition of the present invention. The component (C) may use either a single compound, or a combination of two or more different compounds.

There are no particular restrictions on the component (C), provided it is an onium salt photoinitiator that is capable of generating cations upon irradiation with ultraviolet light. Examples of this photoinitiator include diaryliodonium salts, triarylsulfonium salts, triarylselenonium salts, tetraarylphosphonium salts and aryldiazonium salts, represented by the formulas $R^2{}_2I^+X^-$, $R^2{}_3S^+X^-$, $R^2{}_3Se^+X^-$, $R^2{}_4P^+X^-$ and $R^2N_2{}^+X^-$ respectively wherein, $R^2$ represents an aryl group such as a phenyl group or a tolyl group, and $X^-$ represents an anion such as $SbF_6{}^-$, $AsF_6{}^-$, $PF_6{}^-$, $BF_4{}^-$, $HSO_4{}^-$ or $ClO_4{}^-$. Of the above onium salt photoinitiators, in terms of curing reactivity, diaryliodonium and triarylsulfonium hexafluoroantimonates are preferred.

There are no particular restrictions on the quantity added of the component (C), provided the quantity is effective as an onium salt photoinitiator, namely, provided the quantity is effective in curing the silicone composition of the present invention when the composition is irradiated with ultraviolet light. The quantity of the component (C) is typically within a range from 0.1 to 20 parts by mass, and preferably from 0.5 to 10 parts by mass, either per 100 parts by mass of the component (A), or per 100 parts by mass of the combination of the component (A) and the component (B). Provided the quantity of the component (C) is within this range, the curability of the composition of the present invention is more favorable, and the surface state of a cured coating formed from the composition can be better maintained, meaning the release properties of a produced release paper can be improved.

[Other Components]

The silicone composition of the present invention may also include other components if required, including epoxy-based diluents, vinyl ether-based diluents, adhesion improvers for improving the adhesion to substrates, leveling agents, antistatic agents, defoaming agents, pigments, and other organopolysiloxanes besides the component (A) and the component (B). Particular examples of these other organopolysiloxanes besides the component (A) and the component (B) include epoxy group-containing organopolysiloxanes besides the component (A) and the component (B), which may be added for the purpose of regulating the peel strength. Furthermore, although the silicone composition of the present invention can be used in a solventless form, it may also be diluted with an organic solvent if required.

[Composition]

The silicone composition of the present invention can be easily prepared by mixing the component (A) and the component (C), and where required the component (B) and any other components. In those cases where the component (B) and/or other components are added, the photoinitiator of the component (C) may be either mixed at the same time as the other components, or the other components besides the component (C) may be mixed first, and the component (C) then mixed into the resulting mixture.

In those cases where the silicone composition of the present invention does not include the component (B), the viscosity of the composition at 25° C. is typically not more than 100 mPa s, and from the viewpoint of achieving favorable wetting of substrates by the composition, the viscosity is preferably within a range from 50 to 100 mPa·s. Furthermore, in those cases where the silicone composition of the present invention includes the component (B), from the viewpoint of the wetting property described above, the viscosity of the composition at 25° C. is preferably not more than 100 mPa·s, and is more preferably within a range from 50 to 100 mPa·s.

[Uses]

Because the composition of the present invention can be cured readily by a short period of irradiation with ultraviolet light, the composition can be used as a release agent for release papers and release films, a coating agent for release papers for use with pressure-sensitive adhesive labels, a treatment agent for the rear surface of pressure-sensitive adhesive tapes, and a protective coating agent for metals and plastics.

Examples of substrates that may be coated with the composition of the present invention include laminated substrates composed of a polyethylene laminated on top of a non-woven fabric support; paper substrates such as glassine paper, kraft paper and clay-coated paper; laminated papers such as polyethylene-laminated high-quality paper and polyethylene-laminated kraft paper; plastic films and plastic sheets formed using synthetic resins such as polyester, polypropylene, polyethylene, polyvinyl chloride, polytetrafluoroethylene and polyimide; and metal foils of metals such as aluminum. In terms of maximizing the effects of the present invention, laminated substrates composed of a polyethylene laminated on top of a non-woven fabric support are particularly desirable.

Application of the composition of the present invention to the substrate can be conducted using a conventional method such as roller coating, gravure coating, wire-doctor coating, air-knife coating or dip coating. The coating quantity is typically within a range from 0.01 to 100 g/m², and the applied coating can be readily cured by irradiation with ultraviolet light. Examples of the ultraviolet light source include a high-pressure mercury lamp, medium-pressure mercury lamp, low-pressure mercury lamp, metal halide lamp, or mercury arc lamp. When a high-pressure mercury lamp (80 W/cm) is used as the light source, the applied coating can be cured by irradiation for 0.01 to 10 seconds from a distance of 5 to 20 cm.

EXAMPLES

Specifics of the present invention are described below using a series of examples, comparative examples and synthesis examples, although the present invention is in no way limited by the examples presented below. Viscosity values refer to values measured at 25° C. using a rotational viscometer. Further, "Me" represents a methyl group.

[Peel Strength]

In order to evaluate cured coatings of the silicone compositions of the present invention, the peel strength was measured in the manner described below.

The silicone composition was applied to a laminated substrate composed of a polyethylene laminated on top of a non-woven fabric support, using a coating quantity of approximately 0.8 g/m², thus forming a coating. The applied coating was then irradiated with ultraviolet light from two 80 W/cm high-pressure mercury lamps that generated an exposure dose of 70 mJ/cm², thus forming a cured coating. A kraft pressure-sensitive adhesive tape No. 712F (a product name, manufactured by Nitto Denko Corporation) was bonded to the surface of the cured coating, and compression was then applied by rolling a 2 kg roller back and forth across the surface, thereby completing preparation of a sample for measuring the peel strength.

A load of 70 g/cm² was applied to the sample, and the sample was aged for 20 to 24 hours at 50° C. Subsequently, a tensile tester was used to pull the bonded tape away from the coating at an angle of 180° and at a peel speed of 0.3 m/minute, 5 m/minute or 30 m/minute. The force (N/50 mm) required to peel the tape was measured at each of the peel speeds.

Example 1

An epoxy group-containing organopolysiloxane 1 (100 parts by mass) corresponding with the component (A) and represented by a formula (10) shown below:

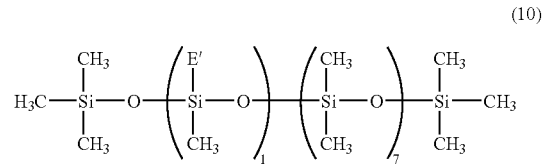

(10)

wherein E' represents a group represented by the formula shown below:

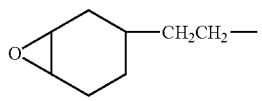

was mixed with an iodonium salt photoinitiator CAT-7605 (1 part by mass) (a product name, manufactured by Shin-Etsu Chemical Co., Ltd.), thus forming a silicone composition. The peel strength of a cured coating of this silicone composition was measured in accordance with the evaluation method described above. The results are shown in Table 1.

Synthesis Example 1

A four-necked flask fitted with a stirrer, a thermometer, a reflux condenser, and a dropping funnel was charged with toluene (50 parts by mass), a dimethylpolysiloxane having OH groups at both terminals and having a viscosity at 25° C. of 700 mPa·s (17.7 parts by mass), and an organohydrogenpolysiloxane represented by a formula (11) shown below (100 parts by mass), and the components were mixed together thoroughly.

$$Me_3SiO—(HMeSiO)_3\text{-}(Me_2SiO)_{25}—SiMe_3 \quad (11)$$

To the resulting mixture was added a 2% by mass toluene solution of a platinum catalyst (0.1 parts by mass), and the mixture was refluxed for 3 hours at 115° C. The reaction mixture was then cooled to 80° C., and 4-vinylcyclohexene oxide (21.0 parts by mass) was added dropwise over a period of two hours. Following completion of the dropwise addition, the resulting mixture was stirred at 80° C. for a further one hour. The toluene and other volatile components were then removed by distillation at 80° C. and 3 Torr, yielding an epoxy group-containing organopolysiloxane 2 (128 parts by mass). The epoxy group-containing organopolysiloxane 2 had a viscosity of 150 mPa·s and an epoxy equivalent weight of 1150 g/mol. The epoxy group-containing organopolysiloxane 2 was a mixture of an epoxy group-containing organopolysiloxane represented by the formula shown below:

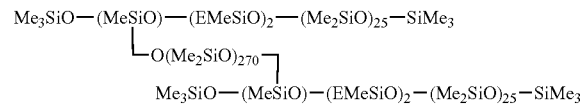

and another epoxy group-containing organopolysiloxane represented by the formula shown below:

$$Me_3SiO.(EMeSiO)_3.(Me_2SiO)_{25}.SiMe_3$$

Example 2

With the exception of replacing the epoxy group-containing organopolysiloxane 1 (100 parts by mass) of example 1 with a mixture (100 parts by mass) prepared by thoroughly mixing the epoxy group-containing organopolysiloxane 1 (30 parts by mass) and the epoxy group-containing organopolysiloxane 2 (70 parts by mass) prepared in the synthesis example 1, a composition was prepared in the same manner as example 1, and the peel strength of the cured coating was measured. The results are shown in Table 1.

Example 3

With the exceptions of altering the quantity of the epoxy group-containing organopolysiloxane 1 from 30 parts by mass to 60 parts by mass, and altering the quantity of the epoxy group-containing organopolysiloxane 2 from 70 parts by mass to 40 parts by mass, a composition was prepared in the same manner as example 2, and the peel strength of the cured coating was measured. The results are shown in Table 1.

Synthesis Example 2

Using the same method as the synthesis example 1, but with the exceptions of altering the quantity of the dimethylpolysiloxane having OH groups at both terminals and having a viscosity at 25° C. of 700 mPa·s from 17.7 parts by mass to 17.6 parts by mass, replacing the organohydrogenpolysiloxane represented by the formula (11) shown above (100 parts by mass) with an organohydrogenpolysiloxane represented by a formula (12) shown below (100 parts by mass), $$Me_3SiO—(HMeSiO)_8\text{-}(Me_2SiO)_{90}—SiMe_3 \quad (12)$$

and altering the quantity of the 4-vinylcyclohexene oxide from 21.0 parts by mass to 20.0 parts by mass, synthesis was conducted in the same manner as synthesis example 1, yielding an epoxy group-containing organopolysiloxane 3 (125 parts by mass). The epoxy group-containing organopolysiloxane 3 had a viscosity of 900 mPa·s and an epoxy equivalent weight of 1100 g/mol. The epoxy group-containing organopolysiloxane 3 was a mixture of an epoxy group-containing organopolysiloxane represented by the formula shown below:

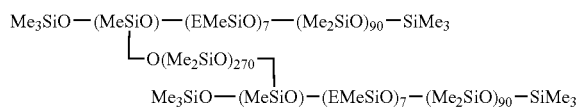

and another epoxy group-containing organopolysiloxane represented by the formula shown below:

$$Me_3SiO.(EMeSiO)_8.(Me_2SiO)_{90}.SiMe_3$$

Example 4

With the exception of replacing the epoxy group-containing organopolysiloxane 2 of example 3 with the epoxy group-containing organopolysiloxane 3, a composition was prepared in the same manner as example 3, and the peel strength of the cured coating was measured. The results are shown in Table 1.

Comparative Example 1

With the exception of replacing the epoxy group-containing organopolysiloxane 1 (100 parts by mass) of example 1 with the epoxy group-containing organopolysiloxane 2 (100 parts by mass), a composition was prepared in the same manner as example 1, and the peel strength of the cured coating was measured. The results are shown in Table 1.

Comparative Example 2

With the exception of replacing the epoxy group-containing organopolysiloxane 1 (100 parts by mass) of example 1 with an epoxy group-containing organopolysiloxane 4 containing two epoxy groups represented by a formula (13) shown below (100 parts by mass):

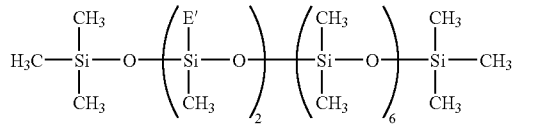
(13)

wherein E' is as defined above,
a composition was prepared in the same manner as example 1, and the peel strength of the cured coating was measured. The results are shown in Table 1.

[Evaluation]

In examples 1 to 4, the peel strength increased as the peel speed was increased, confirming that the peel strength exhibited a positive dependency on the peel speed.

In comparative example 1, the silicone composition includes the component (B) but does not contain the component (A), and the peel strength did not exhibit a positive peel speed dependency.

In comparative example 2, the component (A) was replaced with an organopolysiloxane that had the same polymerization degree and the like as the component (A) but contained two epoxy groups within the molecule. The peel strength did not exhibit a positive peel speed dependency.

TABLE 1

| | Silicone composition | | | | | Peel strength (N/50 mm) | | |
|---|---|---|---|---|---|---|---|---|
| | Component (A) | | Component (B) | | | | | |
| | Epoxy group-containing organopolysiloxane | Blend quantity (parts by mass) | Epoxy group-containing organopolysiloxane | Blend quantity (parts by mass) | Viscosity (mPa·s) | Peel speed 0.3 m/min. | Peel speed 5 m/min. | Peel speed 30 m/min. |
| Example 1 | 1 | 100 | — | 0 | 30 | 0.82 | 1.16 | 1.94 |
| Example 2 | 1 | 30 | 2 | 70 | 90 | 0.13 | 0.37 | 0.58 |
| Example 3 | 1 | 60 | 2 | 40 | 50 | 0.14 | 0.40 | 0.51 |
| Example 4 | 1 | 60 | 3 | 40 | 95 | 0.17 | 0.34 | 0.45 |
| Comparative example 1 | — | 0 | 2 | 100 | 150 | 0.13 | 0.81 | 0.75 |
| Comparative example 2 | 100 parts by mass of the epoxy group-containing organopolysiloxane 4 | | | | 60 | 4.51 | 1.48 | 1.19 |

What is claimed is:

1. An ultraviolet-curable silicone composition for a release paper, the composition comprising:
(A) 100 parts by mass of an organopolysiloxane containing one epoxy group, represented by a general formula (1) shown below:

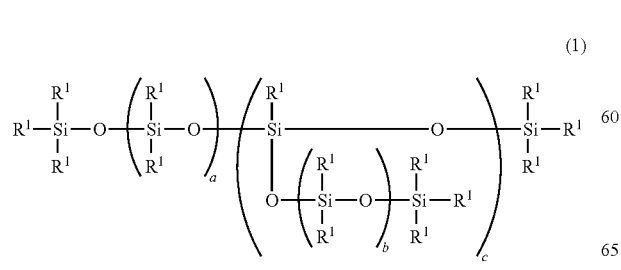
(1)

wherein each $R^1$ represents, independently, a substituted monovalent hydrocarbon group of 1 to 10 carbon atoms containing an epoxy group, or an unsubstituted or substituted monovalent hydrocarbon group of 1 to 10 carbon atoms that does not contain an epoxy group, provided that only one of all the $R^1$ groups is a substituted monovalent hydrocarbon group of 1 to 10 carbon atoms containing an epoxy group, a and b each represents an integer of 0 or greater, and c represents an integer of 0 to 5, provided that $a+(b+2)\times c+2$ is an integer of 8 to 20, and (C) an effective quantity of an onium salt photoinitiator.

2. The composition according to claim 1, having a viscosity at 25° C. of not more than 100 mPa·s.

3. The composition according to claim 1, further comprising:
(B) 10 to 1,000 parts by mass of at least one epoxy group-containing organopolysiloxane selected from the group consisting of organopolysiloxanes containing a plurality of epoxy groups represented by general formulas (2) to (9) shown below:

(2)

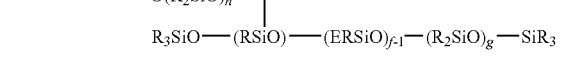

(3)

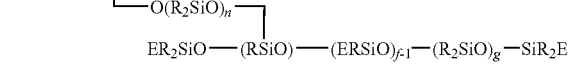

-continued

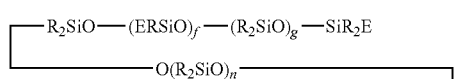   (4)

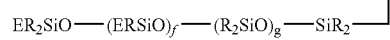   (5)

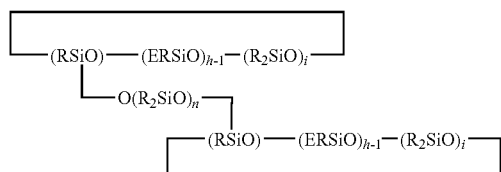   (6)

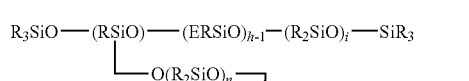   (7)

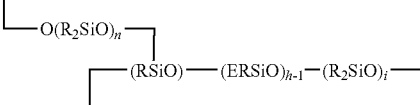   (8)

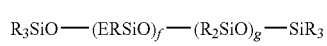   (9)

wherein R represents an unsubstituted or substituted monovalent hydrocarbon group of 1 to 10 carbon atoms that does not contain an epoxy group, E represents an epoxy group-containing monovalent organic group, f, h and n each represents an integer of 2 or greater, and g and i each represents an integer of 0 or greater.

4. The composition according to claim 1, wherein
in the component (A), the substituted monovalent hydrocarbon group of 1 to 10 carbon atoms containing an epoxy group is represented by a formula shown below:

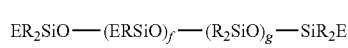

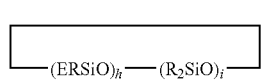

wherein x represents an integer of 0 to 8, y represents an integer of 0 to 7, and z represents an integer of 0 to 4.

5. The composition according to claim 1, wherein
in the component (A), the substituted monovalent hydrocarbon group of 1 to 10 carbon atoms containing an epoxy group is a β-epoxycyclohexylethyl group.

6. The composition according to claim 1, wherein
in the component (A), other than the $R^1$ group that represents the substituted monovalent hydrocarbon group of 1 to 10 carbon atoms containing an epoxy group, all of the $R^1$ groups are methyl groups.

7. The composition according to claim 3, wherein
in the component (B), all of the R groups are methyl groups.

8. The composition according to claim 3, wherein
in the component (B), E is represented by a formula shown below:

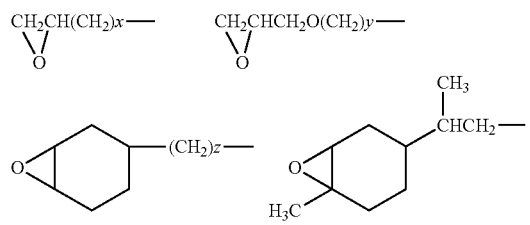

wherein x represents an integer of 0 to 8, y represents an integer of 0 to 7, and z represents an integer of 0 to 4.

9. The composition according to claim 1, wherein the component (C) is:
a diaryliodonium salt represented by a general formula shown below:

$$R^2{}_2I^+X^-$$

wherein $R^2$ represents an aryl group and $X^-$ represents an anion,
a triarylsulfonium salt represented by a general formula shown below:

$$R^2{}_3S^+X^-$$

wherein $R^2$ represents an aryl group and $X^-$ represents an anion,
a triarylselenonium salt represented by a general formula shown below:

$$R^2{}_3Se^+X^-$$

wherein $R^2$ represents an aryl group and $X^-$ represents an anion,
a tetraarylphosphonium salt represented by a general formula shown below:

$$R^2{}_4P^+X^-$$

wherein $R^2$ represents an aryl group and $X^-$ represents an anion,
an aryldiazonium salt represented by a general formula shown below:

$$R^2N_2{}^+X^-$$

wherein $R^2$ represents an aryl group and $X^-$ represents an anion, or
a combination thereof.

10. A cured coating obtained by curing an ultraviolet-curable silicone composition for a release paper comprising:
(A) 100 parts by mass of an organopolysiloxane containing one epoxy group, represented by a general formula (1) shown below:

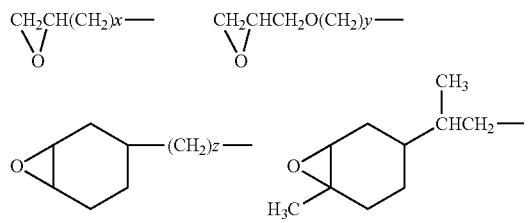   (1)

wherein each $R^1$ represents, independently, a substituted monovalent hydrocarbon group of 1 to 10 carbon atoms containing an epoxy group, or an unsubstituted or substituted monovalent hydrocarbon group of 1 to 10 carbon atoms that does not contain an epoxy group, provided that only one of all the $R^1$ groups is a substituted monovalent hydrocarbon group of 1 to 10 carbon atoms containing an epoxy group, a and b each represents an integer of 0 or greater, and c represents an integer of 0 to 5, provided that $a+(b+2)\times c+2$ is an integer of 8 to 20, and (C) an effective quantity of an onium salt photoinitiator.

11. A release paper comprising:
a substrate, and
a cured coating formed on top of the substrate, wherein the cured coating is obtained by curing an ultraviolet-curable silicone composition comprising:
(A) 100 parts by mass of an organopolysiloxane containing one epoxy group, represented by a general formula (1) shown below:

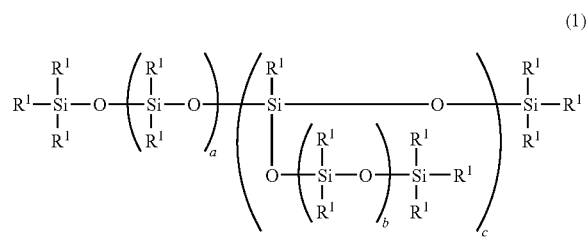

(1)

wherein each $R^1$ represents, independently, a substituted monovalent hydrocarbon group of 1 to 10 carbon atoms containing an epoxy group, or an unsubstituted or substituted monovalent hydrocarbon group of 1 to 10 carbon atoms that does not contain an epoxy group, provided that only one of all the $R^1$ groups is a substituted monovalent hydrocarbon group of 1 to 10 carbon atoms containing an epoxy group, a and b each represents an integer of 0 or greater, and c represents an integer of 0 to 5, provided that $a+(b+2)\times c+2$ is an integer of 8 to 20, and (C) an effective quantity of an onium salt photoinitiator.

12. The composition according to claim 1, wherein each $R^1$ represents, independently, a substituted monovalent hydrocarbon group of 1 to 8 carbon atoms containing an epoxy group, or an unsubstituted or substituted monovalent hydrocarbon group of 1 to 8 carbon atoms that does not contain an epoxy group, provided that only one of all the $R^1$ groups is a substituted monovalent hydrocarbon group of 1 to 8 carbon atoms containing an epoxy group.

13. The composition according to claim 1, wherein each $R^1$ represents, independently, a substituted monovalent hydrocarbon group of 1 to 6 carbon atoms containing an epoxy group, or an unsubstituted or substituted monovalent hydrocarbon group of 1 to 6 carbon atoms that does not contain an epoxy group, provided that only one of all the $R^1$ groups is a substituted monovalent hydrocarbon group of 1 to 6 carbon atoms containing an epoxy group.

14. The cured coating according to claim 10, wherein each $R^1$ represents, independently, a substituted monovalent hydrocarbon group of 1 to 8 carbon atoms containing an epoxy group, or an unsubstituted or substituted monovalent hydrocarbon group of 1 to 8 carbon atoms that does not contain an epoxy group, provided that only one of all the $R^1$ groups is a substituted monovalent hydrocarbon group of 1 to 8 carbon atoms containing an epoxy group.

15. The cured coating according to claim 10, wherein each $R^1$ represents, independently, a substituted monovalent hydrocarbon group of 1 to 6 carbon atoms containing an epoxy group, or an unsubstituted or substituted monovalent hydrocarbon group of 1 to 6 carbon atoms that does not contain an epoxy group, provided that only one of all the $R^1$ groups is a substituted monovalent hydrocarbon group of 1 to 6 carbon atoms containing an epoxy group.

16. The release paper according to claim 11, wherein each $R^1$ represents, independently, a substituted monovalent hydrocarbon group of 1 to 8 carbon atoms containing an epoxy group, or an unsubstituted or substituted monovalent hydrocarbon group of 1 to 8 carbon atoms that does not contain an epoxy group, provided that only one of all the $R^1$ groups is a substituted monovalent hydrocarbon group of 1 to 8 carbon atoms containing an epoxy group.

17. The release paper according to claim 11, wherein each $R^1$ represents, independently, a substituted monovalent hydrocarbon group of 1 to 6 carbon atoms containing an epoxy group, or an unsubstituted or substituted monovalent hydrocarbon group of 1 to 6 carbon atoms that does not contain an epoxy group, provided that only one of all the $R^1$ groups is a substituted monovalent hydrocarbon group of 1 to 6 carbon atoms containing an epoxy group.

* * * * *